United States Patent [19]

Cabana

[11] Patent Number: 5,222,894
[45] Date of Patent: Jun. 29, 1993

[54] SIMULATED AMPHIBIOUS VEHICULAR ENVIRONMENTS

[76] Inventor: Jacqueline Cabana, P.O. Box 1975, Oldsmar, Fla. 34677

[21] Appl. No.: 755,101

[22] Filed: Sep. 5, 1991

[51] Int. Cl.[5] ............................................. G09B 9/06
[52] U.S. Cl. ...................................................... 434/29
[58] Field of Search ............................................ 434/29

[56] References Cited

U.S. PATENT DOCUMENTS

| | | | |
|---|---|---|---|
| 3,542,934 | 11/1990 | Warhurst et al. | 434/29 |
| 3,561,137 | 2/1971 | Guyan et al. | 434/29 |
| 3,596,375 | 8/1971 | Herview | 434/29 |
| 3,871,113 | 3/1975 | Crago et al. | 434/29 |
| 4,026,038 | 5/1977 | Sunter et al. | 434/29 |
| 4,822,281 | 4/1989 | Zajicek | 434/29 |
| 4,854,876 | 8/1989 | Heath et al. | 434/29 |

*Primary Examiner*—William H. Grieb

[57] ABSTRACT

Simulation of amphibious vehicular environments, with a housing simulating part of a transport ship's hull, located at least partly over a body of water, movably mounted to simulate seagoing characteristics, and having ramp means adapted to extend onto the water, enabling the launching of amphibious vehicles from inside the housing and recovery of such vehicles back into the housing. Simulation is practiced by assembling and confining an amphibious crew in the housing, limiting the crew's perception of the external environment, providing cues perceptible by the crew as being characteristic of seagoing transport, furnishing the crew with an amphibious vehicle, instructing the crew in its operation, whether the vehicle floats by water displacement or hovers over the surface of the water, then deploying a launching-and-recovery ramp from the housing onto the water, launching the amphibious vehicle down the ramp, maneuvering it, and finally recovering it up the ramp and back into the housing.

22 Claims, 8 Drawing Sheets

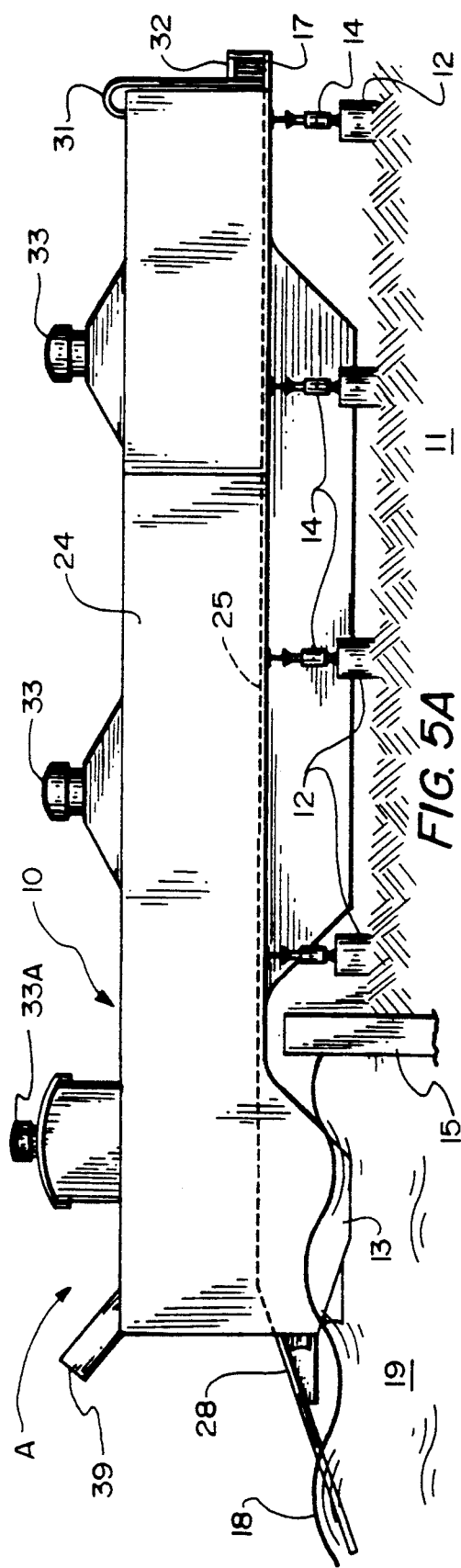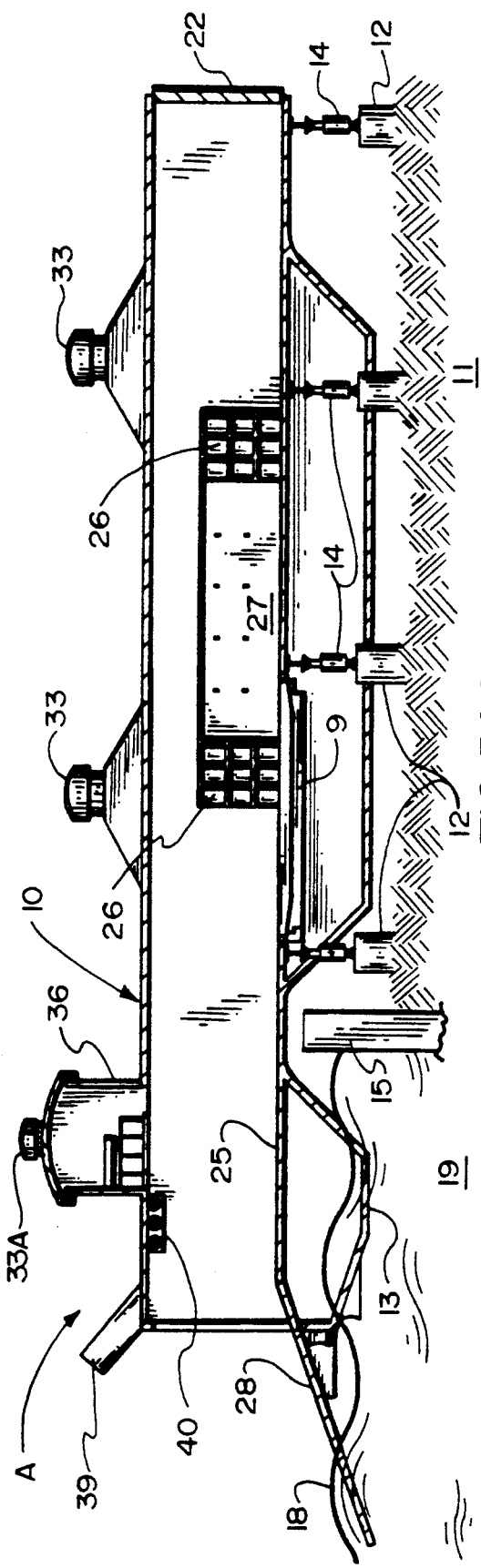

SIMULATED AMPHIBIOUS VEHICULAR ENVIRONMENTS

TECHNICAL FIELD

This invention relates to methods and means for simulating amphibious vehicular environments, especially for training purposes.

BACKGROUND OF THE INVENTION

Opportunities to train amphibious crews in launching, maneuvering, landing, and recovery are limited by ship availability, lengthy requisition process, crew distribution, travel requirements, weather conditions, and political climate, as well as by budgetary, time, and other personnel constraints. Yet it is imperative that crews receive adequate training before engaging in such inherently hazardous operations, possibly subjected simultaneously to heavy weather, enemy fire, or unexpected equipment malfunction.

Simulators have proved their worth in regard to air, land, sea, and undersea activities, but heretofore amphibious operations have not received comparable attention or achieved appreciable success, probably owing in large part to the diversity of demands made upon amphibious personnel and their equipment in actual operations. The variety of requirements necessitates a diversified approach to such training and to the conditions to be encountered, especially at the interface between shipboard and waterborne status of individual amphibious craft, whether designed to displace water or to hover above the water surface. Various types of amphibious craft are commonly transported to and from operational areas on a transport vessel dedicated to that task and sometimes referred to as a landing ship.

Inventive contributions to seagoing situations have tended to concentrate upon simulating pitch and roll as in U.S. Pat. No. 3,561,137 to Guyon or U.S. Pat. No. 4,822,281 to Zajicek; or to simulating maneuvering and navigation, as in U.S. Pat. No. 3,596,375 to Hervieu. U.S. Pat. No. 3,871,113 to Crago and Emmerson, and U.S. Pat. No. 4,026,038 to Sunter and Prins. More recent U.S. Pat. No. 4,854,876 to Heath and Cole for an Aircraft Carrier Simulator and Method exemplifies novel simulation of the difficult airborne-to-shipboard transition.

My invention is directed to simulating the difficult transition for amphibious vehicles from shipboard to waterborne status and back onto shipboard so as to expose amphibious crews to a wide variety of situations such as they might encounter during and after deployment.

SUMMARY OF THE INVENTION

A primary object of the present invention is to train crews in amphibious operations while simulating their seagoing environment.

Another object of this invention is to provide aural, tactile, and visual cues characteristic of such seagoing environment.

A further object of the invention is to provide both simulated shipboard and transitional waterborne amphibious experience.

In general, the objects of the present invention are attained by means of a housing simulating part of the hull of a vessel useful in transporting amphibious vehicles, located at least partly over a body of water, movably mounted to simulate seagoing characteristics, and having ramp means adapted to extend onto the water, enabling the launching of amphibious vehicles from the housing down the ramp.

More particularly, the invention includes enclosing a crew in the housing, substantially isolating them from the external environment, providing them with amphibious vehicles, and exposing them to cues characteristic of such seagoing environment.

The invention is embodied in a simulated transport vessel for amphibious vehicles and crews, mounted partly or wholly over water for multi-directional movement, such as in azimuth, pitch, and roll. The housing of such simulated hull portion includes such devices as a loading gantry at one end, and a launching-and-recovery ramp at the opposite end, and a flagmen's station rising above the housing. Communication and control facilities are conveniently present in the flagmen's station, in the housing interior, and in a shore station.

The crews are confined sufficiently to restrict substantially their perception of the external environment. They are exposed to aural, visual, and tactile cues consistent with seagoing sounds, sights, and movements while receiving instruction in procedures of amphibious launching, maneuvering, landing, and recovery. Trained crews launch amphibious vehicles from the simulator down a ramp onto an adjacent body of water and later are recovered back up the ramp.

SUMMARY OF THE DRAWINGS

FIG. 5A is a side elevation of the first embodiment; and

FIG. 5AA is a longitudinal sectional elevation of the same.

DESCRIPTION OF THE INVENTION

Figure 1:
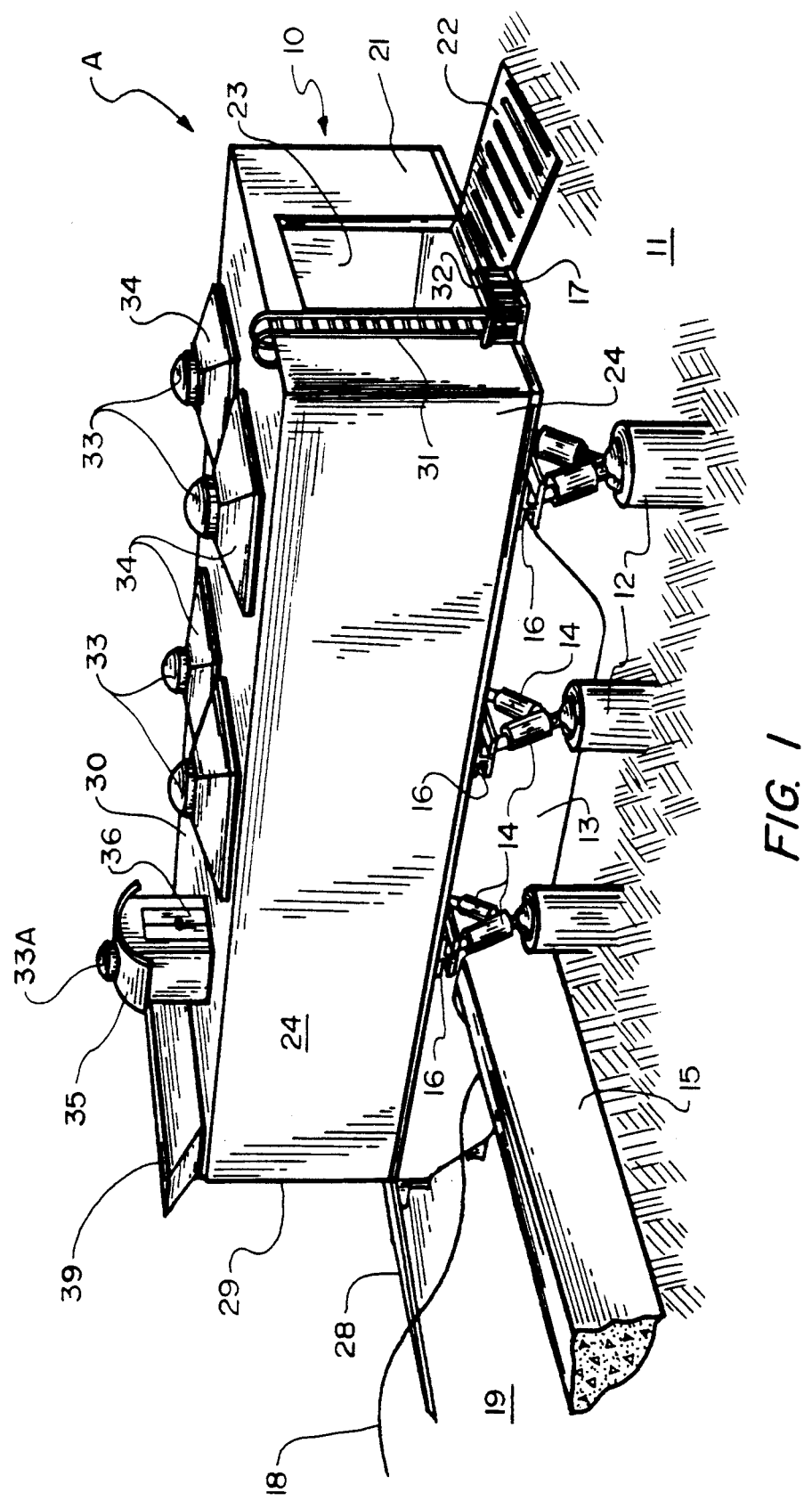
FIG. 1 is a perspective view of a first embodiment of simulator of amphibious vehicular environments according to this invention.

FIG. 1 shows, in perspective, simulator embodiment "A" having housing 10 simulating the aft portion of part of a transport ship such as conventionally used to carry amphibious crews and vehicles, as well as other personnel and materiel. Most of the housing, including forward end 21, is shown extending over land mass 11, with gantry gate 22 deployed, as for loading (or unloading) via the land. Aft end 29 of the housing is shown with its stern gate 28 extending over and onto or into body of water 19 (see wavy surface line 18) in fully open position, deployed as a ramp for launching and recovery of amphibious vehicles. The body of water is separated from the land mass by sea wall 15 (shaded for concrete where broken away).

Hull-simulating housing 10 is supported by pilings 12 upstanding from an underlying land mass 11, via hydraulic actuators 14 shown in piston-and-cylinder form, each piling being provided with a pair of such actuators, which support transverse I-beams. Underlying truss structure 13 (covered and largely schematic here) supports 18 the housing longitudinally. Near wall 24 of the housing is windowless, as is the rest of the housing so as to isolate crews inside from the external environment in favor of the simulated environment presented to them according to this invention.

Rising above housing overhead 30 are two pairs of ventilators 33, flagmen's station 35 with ventilator 33a and with entry door 36 facing forward. Wind-and-rain simulators 39 are directed forward from the far end toward the station (as shown in more detail later). Each of ventilators 33 has a quartet of solar panels 34 arranged in pyramidal form around it. Access ladder 31 rises from platform 17 enclosed by railing 32 alongside gantry 22. No attempt is made here to view the interior through access opening 23, which is normally covered or closed by the gantry in its stowed position, though shown uncovered or open here by reason of deployment of the gantry, but parts of the interior are visible in the next view.

Figure 2:
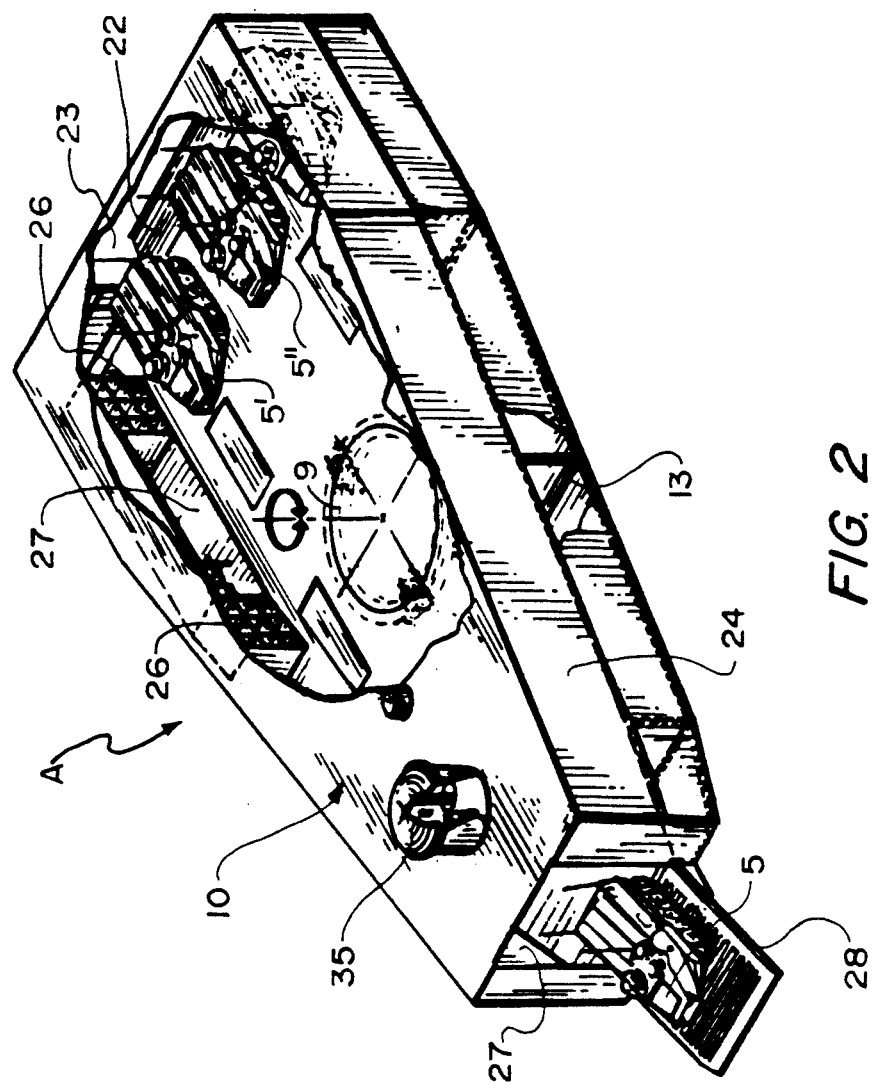
FIG. 2 is a perspective view of same embodiment as in FIG. 1, reoriented and partly cut away to review interior features.

FIG. 2 shows housing 10 reoriented so as to be viewed from a different vantage point, with stern gate 28 still deployed in its launch-and-recovery ramp 28 mode at the lower left, with amphibious vehicle 5 on the ramp, exiting entryway 27 normally covered by the stern gate when in stowed position. Flagmen's station 35 is partly cut away to show control panels inside. Further forward, overhead 30 is cut away to reveal the interior, showing several amphibious vehicles 5', 5'', etc. on deck 25, turntable 9 centrally located at and under the deck level and shelves 26 flanking display area 27. Covered truss structure 13 underneath is partly cut away but otherwise suggested more or less schematically though intended to conform to FIG. 1. Other features of the interior are merely exemplary, and the outer environment is omitted intentionally from this view.

Figure 3:
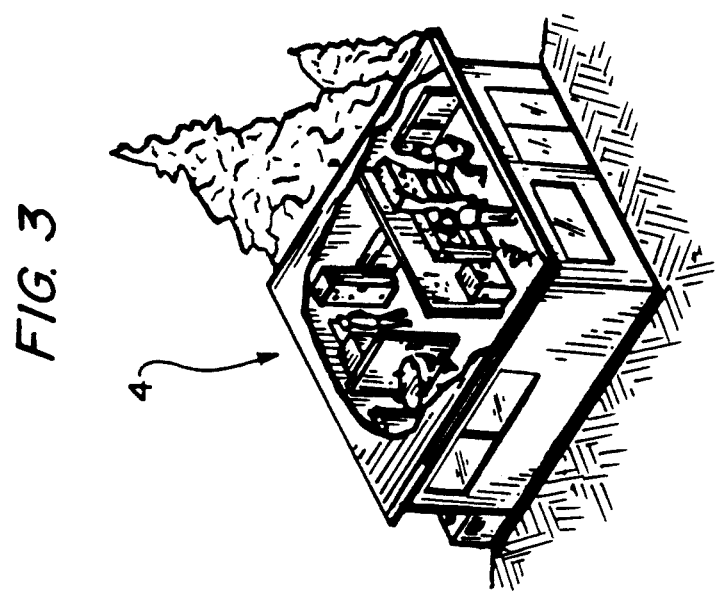
FIG. 3 is a perspective view, similarly partly cut away, of a shore station associated with the foregoing or related embodiments.

FIG. 3 shows ground station 4, in perspective and partly cut away overhead to reveal the interior, which contains electrical and hydraulic components, communications, and control equipment. It normally is manned but could be automatic in substantial part, and is shown here only in a general way. Such equipment includes electrical power line connections, circuit breakers, and connecting lines; communication antennas, control panels, and computers; controls for pumps and hydraulic actuators, etc.—whatever is more convenient to house apart from the simulator housing, where space is at a premium.

Figure 4A:
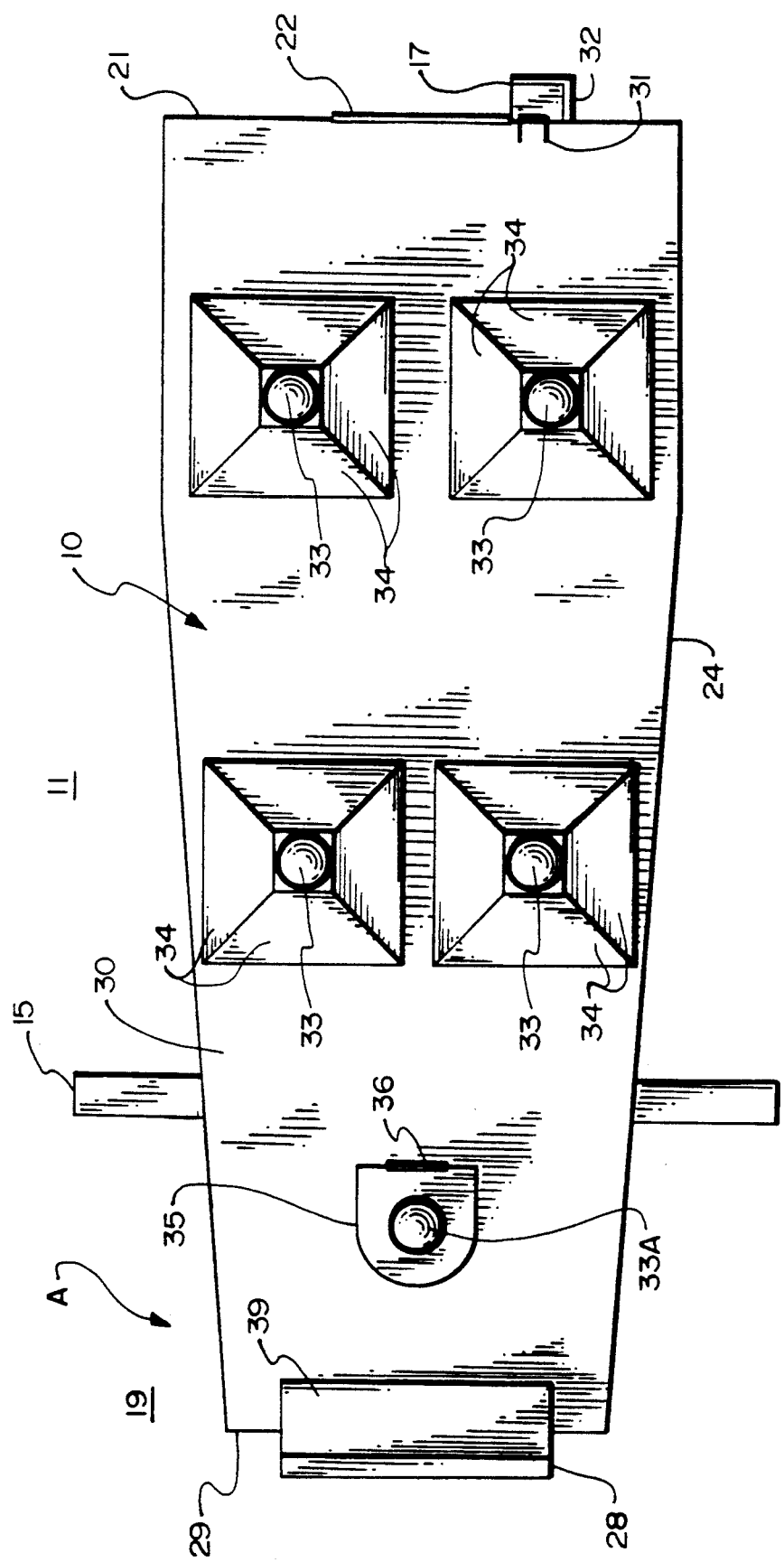
FIG. 4A is a plan view of the simulator embodiment of FIG. 1.

FIG. 4A shows housing 10 of foregoing embodiment A and vicinity in plan, at both sides of sea wall 15—shown in only partial length here. Gantry 22 and stern gate 28 are in their respective upright stowed positions. Ladder 31 and platform 17 adjoin forward end 21 of the housing alongside the stowed gantry. The features above housing 10 are as already described and are not mentioned further here.

Figure 4B:
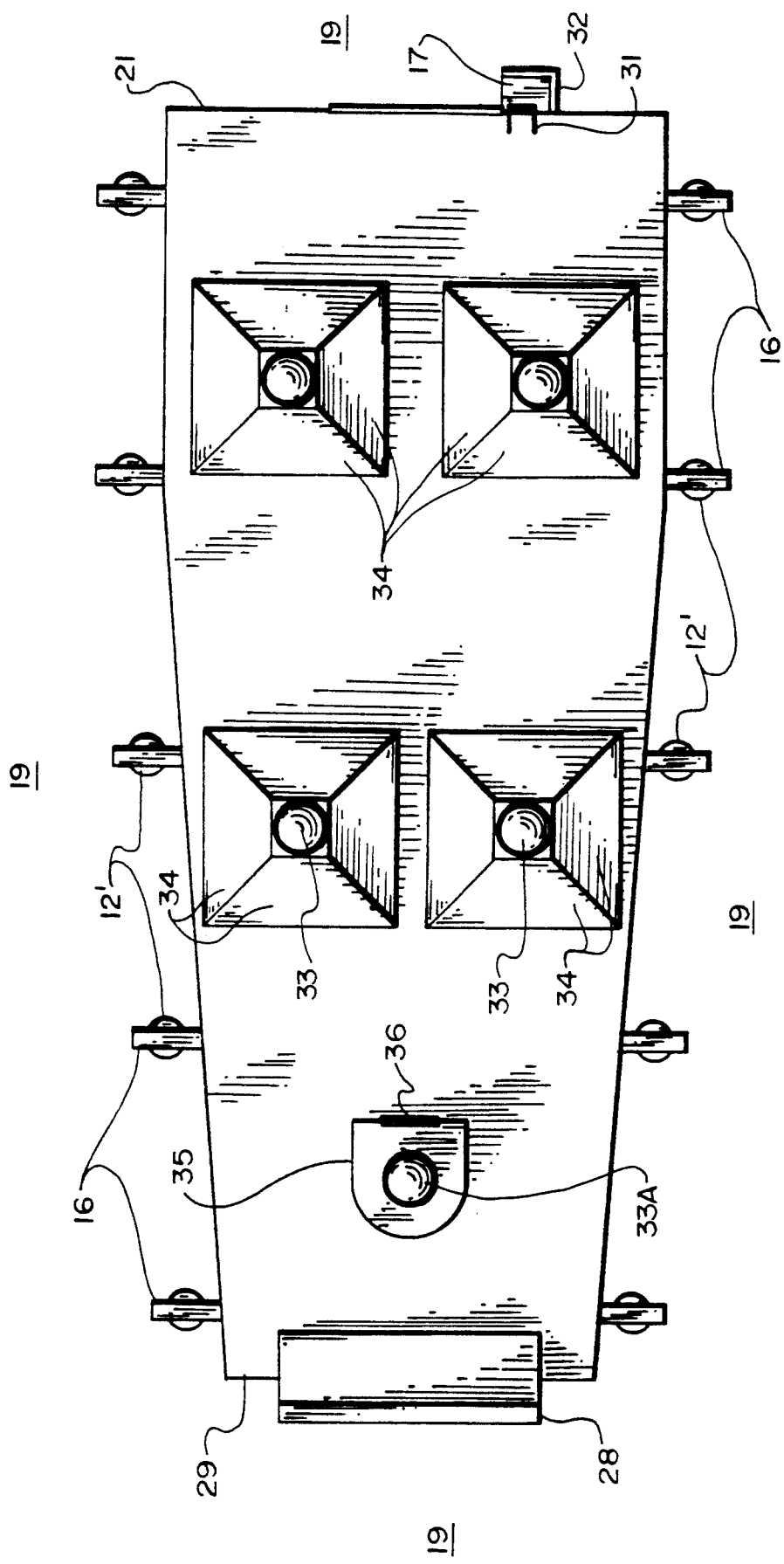
FIG. 4B is a plan view of an alternative or modified simulator embodiment of this invention, with visible outboard supports.

FIG. 4B shows housing 10', of alternative or modified simulator embodiment "B" of this invention, appearing substantially identical to embodiment "A" except for the addition of visible supporting pilings 12' and their supported I-beams 16' outboard of the housing. The reference numerals are primed to indicate that the features so referenced are modified from the corresponding features of the first embodiment. Unmodified features carry the same reference numerals as before and do not need re-identification here. The sea wall of the previous embodiment is not present here, because in this embodiment a body of water 19' surrounds—and underlies—this entire housing.

FIGS. 5A and 5AA show embodiment "A" in side elevation and in longitudinal medial sectional elevation, respectively. FIG. 5A is as would be expected from the perspective view of side 24 in FIG. 1, so it is not described again here. FIG. 5AA is similar but reveals the interior, shown empty here except for pair of shelves 26 flanking control and/or display area 27 (shown fragmentarily in FIG. 2). Trio of signal lights 40 (usually red, amber, and green) appear near the stern gate (shown open in launching-and-recovery ramp position) for use in controlling deployment of amphibious crew and vehicles.

Figure 6A:
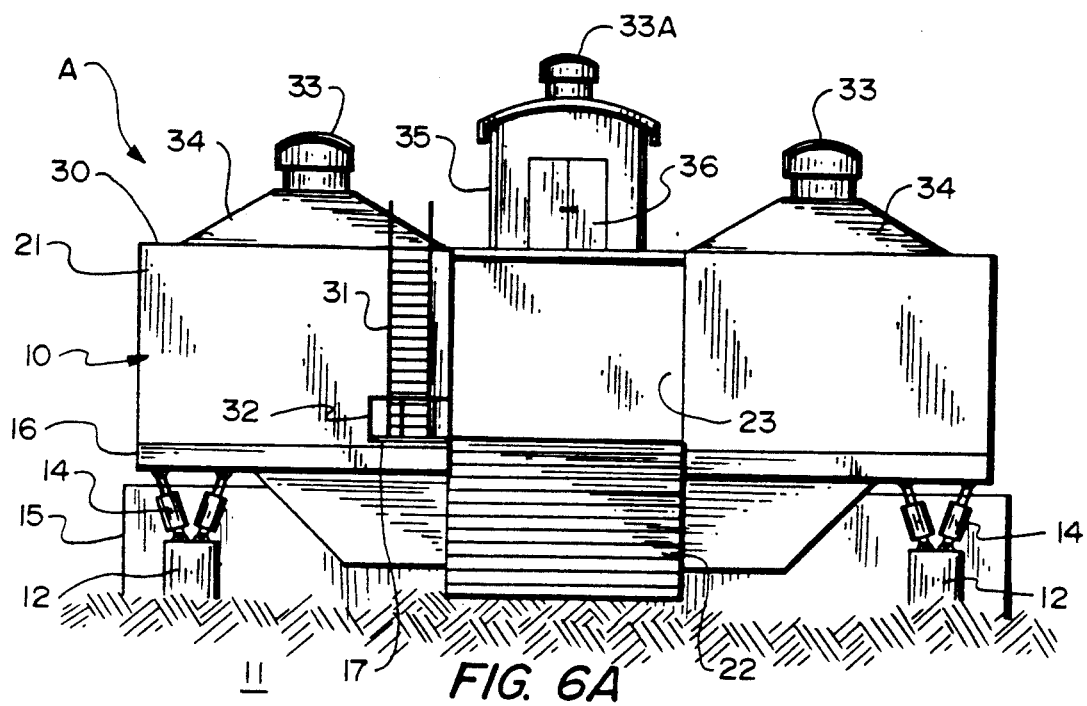
FIG. 6A is a forward or gantry end elevation of the simulator embodiment shown in FIGS. 1, 4A, 5A, 5AA.

FIG. 6A shows forward or gantry end 21 of housing 10 of embodiment "A" with gantry 22 in the deployed position. Pilings 12 with hydraulic actuators 14, support the housing from below, just inboard of each side edge, bearing against transverse I-beam 16. Ladder 31 rises to overhead 30 from platform 17 partially enclosed by railing 32 alongside opening 23 as uncovered by deployment of the gantry. A pair of ventilators 33 seem to flank flagmen's station 35, which has ventilator 33a and entry door 36. The ventilators are surrounded by solar panels 34 slanted like the walls of a pyramid. Sea wall 15 keeps the water from reaching this end of the simulator housing.

Figure 6B:
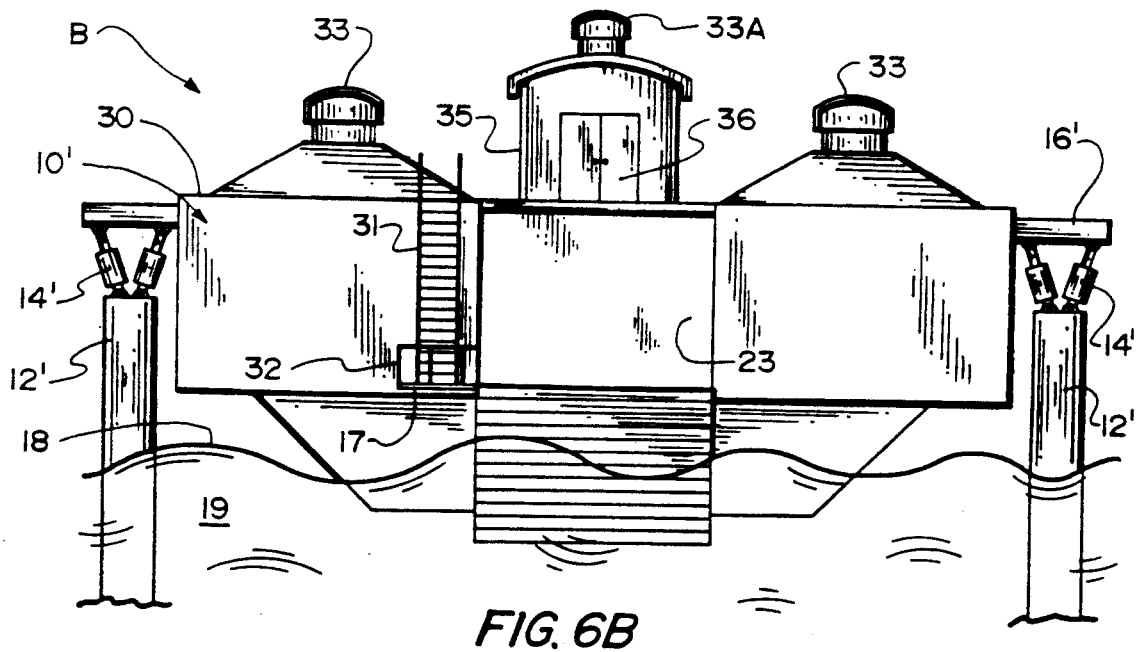
FIG. 6B is a forward or gantry end elevation of the alternative simulator embodiment shown in plan in FIG. 4B.

FIG. 6B shows the forward or gantry end of embodiment "B" and its housing 10' in like manner as FIG. 6A showed embodiment "A" and its housing 10. In this view nearly all the features are the same as in FIG. 6A, except the pilings 12' are spaced outboard of the housing to straddle the sidewalls of the housing and to support via hydraulic actuators 14' the opposite ends of longer transverse I-beams 16' just under the level of overhead 30, instead of at or near the level of deck 25 as in the first shown embodiment.

Figure 7:
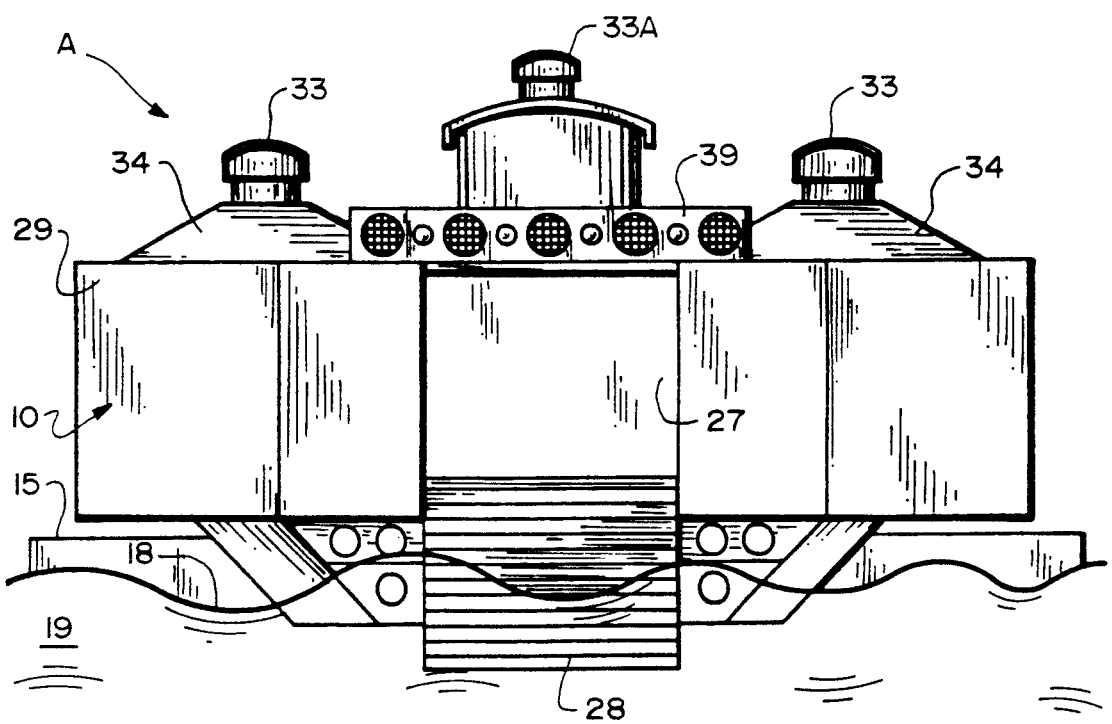
FIG. 7 is an aft or stern gate view of the first embodiment.

FIG. 7 shows aft end 29 of embodiment "A" and reveals intakes of wind-and-rain simulators 39. Stern gate 28 is deployed as a launching-and-recovery ramp, extending into water 18, on the near side of sea wall 15. Access opening 27 uncovered by deployment of the ramp is somewhat wider than the aligned flagmen's station 26.

Figure 8:
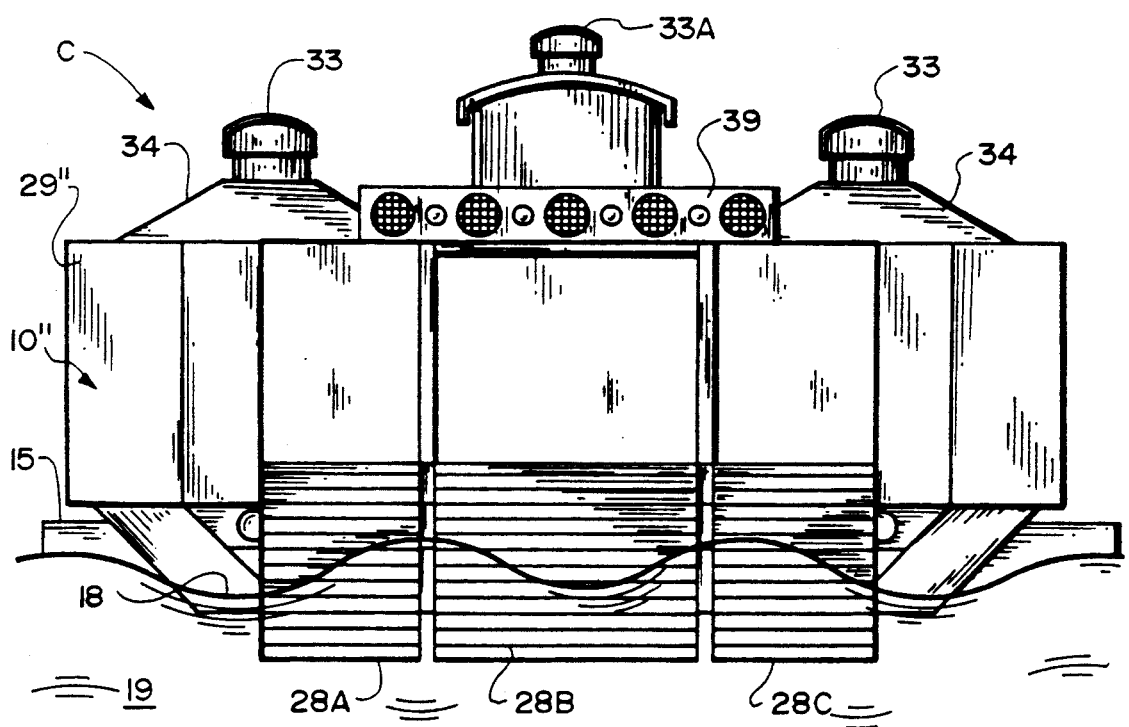
FIG. 8 is an alternative aft or stern gate view thereof.

FIG. 8 shows aft end 29'' of housing 10'' of somewhat different embodiment "C"—which otherwise might resemble either embodiment "B" or embodiment "A" of this invention. This embodiment differs mainly by having a much wider three-part stern gate or launching-and-recovery ramp, with half-width wings 28a and 28c flanking body 28b, a bit wider than the single version of embodiment "A" in FIG. 7. The extra width is useful for launching watercraft that hover above the water surface instead of displacing water for their support—as amphibious craft have traditionally done.

Figure 9:
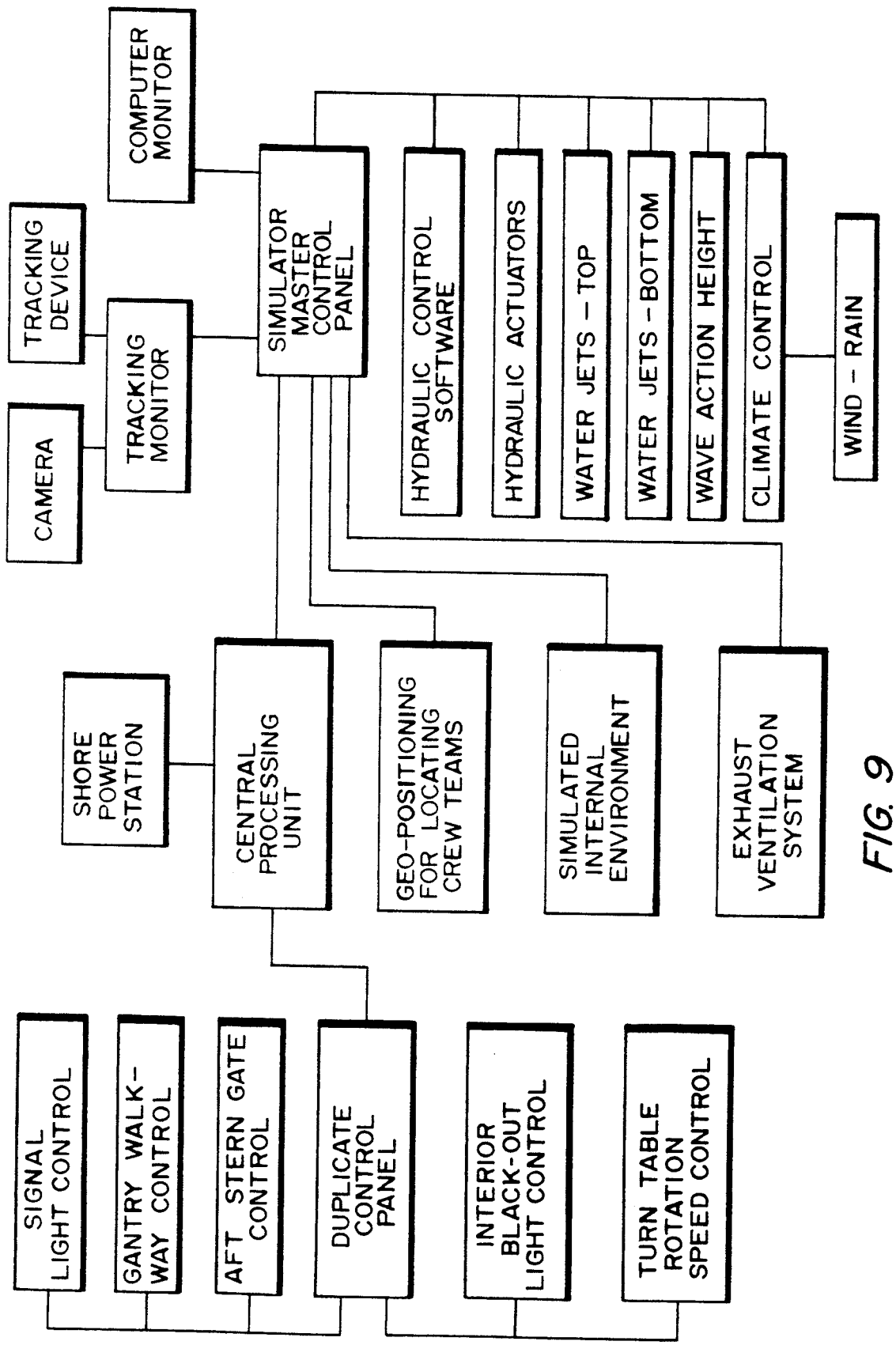
FIG. 9 is a schematic or block diagram of simulation controls.

FIG. 9 shows schematically in block form a schematic or block diagram of simulation controls, communications, and computer means. A central processing unit (CPU) appears in the center, with master control panel to the right and duplicate control panel at the left. Their respective locations are matters of choice, but the CPU may be most conveniently located in the shore station, the master control 29 panel in the flagmen's station, and the duplicate control panel in the control and/or display area in the housing. Included in the latter are the signal light control, interior blackout control, gantry deployment and stow control, stern gate or launching ramp deployment and stow control, and turntable control for adjusting the housing orientation in azimuth (compass heading). The master control panel has camera and tracking controls as part of a tracking monitor, and geo-positioning linkage, as well as a monitor of computer operation. It controls the simulated environmental, including not only such climatic functions as heating, ventilation, and air-conditioning but also simulated aural, visual, and tactile environmental cues. The tactile cues require a variety of controls for hydraulic software, which moves the housing in pitch and roll to simulate whatever type of seagoing environment is desired. External environmental devices control wind and water jets, and wave-generation equipment. Programs for desired training scenarios are contained in appropriate storage.

It will be understood that simulation according to this invention is practiced by assembling and confining an amphibious crew in the simulator housing, closing the access way and thus limiting the crew's perception of the external environment, and providing instead cues perceptible by the crew as being characteristic of seagoing transport. Additional training steps include furnishing the crew with an amphibious vehicle, instructing the crew in its operation, whether the vehicle floats by water displacement or hovers over the surface of the water, then deploying a launching-and-recovery ramp from the housing onto the water, whereupon the crew launches the amphibious vehicle down the ramp, maneuvers it over the adjacent body of water, and finally recovers it up the ramp back into the housing.

Instead of just a dry run, the inventive apparatus and method bridges the transition between largely oral and visual instruction, and actual operations in amphibious vehicles on a body of water. Byproducts of such a program include increase level of crew interest, higher level of crew capability per training time, enhanced safety of amphibious crews in difficult operational conditions, and overall economy of time, effort, and money. These advantages and benefits are readily apparent to anyone familiar with conventional training of amphibious crews, as well as to the crews themselves.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

I claim:

1. Simulated amphibious vehicular environmental (SAVE) system useful in training crews for amphibious vehicular launching and recovery, comprising a movably mounted simulated transport vessel including a housing adapted to extend at least partly over and onto a body of water, exposed to artificially or naturally induced waves therein, and including a launching-and-recovery ramp deployable at one end enabling launching of amphibious vehicles from storage inside the housing onto the body of water and enabling recovery of amphibious vehicles from the body of water back into the housing.

2. SAVE system according to claim 1, wherein the housing is mounted substantially entirely over and onto the body of water.

3. SAVE system according to claim 1, wherein the housing is mounted for controlled movement in azimuth, pitch, and roll.

4. SAVE system according to claim 1, provided with communications and control facilities, including a flagmen's station overlooking the launching-and-recovery ramp.

5. SAVE system according to claim 1, wherein the launching-and-recovery ramp is adapted, when not deployed, to cover an access entryway in the housing uncovered when the ramp is deployed.

6. SAVE system according to claim 1, including a loading-and-unloading ramp deployable at the opposite end of the housing to extend onto the land and adapted to enable loading and unloading of amphibious crews and vehicles into and out from the housing.

7. SAVE system according to claim 6, wherein the loading-and-unloading ramp is adapted, when not deployed, to cover an access entryway in the housing uncovered when the ramp is deployed.

8. Simulated amphibious vehicular environmental SAVE system, comprising a simulated seagoing transport vessel including
    an enclosed housing extending from land onto a body of water and adapted to accommodate amphibious crews and vehicles inside,
    means mounting the housing for controlled movement,
    means adapted to control such movement and thereby to provide to crews inside the housing tactile cues of a seagoing environment,
    means covering an access entryway in the landward end of the housing, deployable to uncover the entryway and extend onto the land to enable loading of amphibious crews and vehicles into the housing,
    and means covering an access entryway in the opposite end of the housing, deployable to uncover the entryway and to extend as a ramp to enable launching of amphibious vehicles onto the water and to enable recovery of launched amphibious vehicles into the housing.

9. SAVE system according to claim 8, wherein such mounting means includes hydraulic actuators enabling controlled pitch and roll.

10. SAVE system according to claim 8, wherein such mounting means includes a turntable enabling controlled movement in azimuth.

11. SAVE system according to claim 8, including means providing aural and visual cues of a seagoing environment to crews inside.

12. SAVE system according to claim 8, wherein an end of the housing is adapted to extend over a sea wall separating the body of water from the land underlying the rest of the housing.

13. Simulation-assisted method of training crews for amphibious launching, maneuvering, landing, and recovery, comprising steps of
    siting the housing of a simulated transport vessel for amphibious vehicles and crews in a land mass adjacent a body of water, and mounting the housing for controlled movement in azimuth, pitch, and roll, and so as to extend at least partially over the optionally onto the water; and enclosing amphibious crews therein, limiting their perception of the external environment, and providing them with aural, visual, and tactile cues perceptible as seagoing transport characteristics.

14. Method according to claim 13, including instructing the crews in procedures essential to launching, maneuvering, landing, or recovery of amphibious vehicles, and simultaneously providing them with perceptual cues consistent with a seagoing environment.

15. Method according to claim 13, including instructing the crews in regard to the operation of amphibious vehicles that float by displacing water, also furnishing such vehicles to the crews for use, and actually launching and recovering such vehicles.

16. Method according to claim 13, including instructing the crews in regard to the operation of amphibious vehicles that hover above the water surface, furnishing such vehicles to the crews for use, and actually launching and recovering such vehicles.

17. Method of training amphibious crews via a simulated transport vessel including a housing mounted for controlled movement at least partly over a body of water and adapted to be extended onto the water, comprising the steps of assembling and confining an amphibious crew in the housing, limiting the crew's perception of the actual external environment, providing cues perceptible by the crew as being characteristic of seagoing transport, furnishing the crew with an amphibious vehicle, and instructing the crew in the operation of such vehicle.

18. Method according to claim 17, including deploying onto the water a launching-and-recovery ramp from an end of the housing, and launching such amphibious vehicles down the ramp and onto the water.

19. Method according to claim 18, including recovering such launched amphibious vehicles up the ramp and back into the housing.

20. Method according to claim 17, including orienting the housing appropriately and extending the launching-and-recovery ramp onto the water before amphibious launching or recovery.

21. Method according to claim 17, including preloading both amphibious vehicle and crew into the housing via an access entryway normally covered by closure means deployable as a gantry at the end thereof opposite the end having the launching-and-recovery ramp.

22. Method according to claim 17, including providing simulated navigation data to the crew before launching, via a visual display of a simulated chart with their position and surroundings displayed.

* * * * *